United States Patent [19]

Hughes, Jr.

[11] 4,078,808
[45] Mar. 14, 1978

[54] DUAL RECORD TOY PHONOGRAPH

[76] Inventor: Alexander W. Hughes, Jr., 19 Wardell Cir., Oceanport, N.J. 07757

[21] Appl. No.: 747,484

[22] Filed: Dec. 6, 1976

[51] Int. Cl.$^2$ ............................ G11B 3/00; G11B 17/06
[52] U.S. Cl. .................................. 274/9 R; 274/1 A; 274/13 R
[58] Field of Search ................ 274/1 A, 9 R, 10 C, 274/15 R, 13 R

[56] References Cited

U.S. PATENT DOCUMENTS

| 2,506,925 | 5/1950  | Johnson   | 274/10 C |
| 2,858,374 | 10/1958 | Goldmark  | 274/10 C |
| 3,055,664 | 9/1962  | Curci     | 274/9 R  |
| 3,411,790 | 11/1968 | Suchowski | 274/1 A  |
| 3,538,638 | 11/1970 | Glass et al. | 274/1 A |
| 3,984,111 | 10/1976 | Hughes    | 274/1 A  |

Primary Examiner—Richard E. Aegerter
Assistant Examiner—John W. Shepperd
Attorney, Agent, or Firm—Hubbell, Cohen, Stiefel & Gross

[57] ABSTRACT

A toy phonograph having a base, a turntable, a first pickup arm engageable with a playing surface of a first phonograph record on one side of the turntable, a second pickup arm engageable with a playing surface of a second phonograph record on the opposite side of the turntable. The first phonograph record having a clockwise sound reproducing groove and the sound reproducing groove of the second phonograph record having a counterclockwise sound reproducing groove. The sound is picked up from the sound reproducing groove by direct resilient contact of a speaker cone assembly with each of the pickup arms which presses the respective pickup arm into playing engagement with the phonograph record. The speaker cone assembly includes a lift bar containing an aperture adjacent the end of the recording with a protrusion on the respective pickup arm being received in the aperture as the pickup arm reaches the end of the recording. The device may function as a talking toy bank wherein a coin inserted in the slot will cause the lift bar aperture to raise a sufficient amount due to engagement of the coin with an extension of the lift bar so as to unseat the protrusion on the associated pickup arm and enable the pickup arm to be resiliently reset to the periphery of the phonograph record, with the activating coin subsequently being dropped into a receptacle therefor.

25 Claims, 6 Drawing Figures

DUAL RECORD TOY PHONOGRAPH

CROSS-REFERENCE TO RELATED APPLICATIONS

This application is related to my previous U.S. Pat. No. 3,984,111, issued Oct. 5, 1976, entitled "Toy Phonograph", and my contemporaneously filed U.S. patent application entitled "Improved Resettable Toy Phonograph", filed Dec. 6, 1976 and bearing U.S. Ser. No. 747,485.

BACKGROUND OF THE INVENTION

1. Field of the Invention

The present invention relates to phonographs and particularly to the types of phonographs knowns as toy phonographs.

2. Description of the Prior Art

Toy phonographs, that is phonographs such as for use as talking voice boxes, such as for talking dolls or other types of so-called talking toys, such as talking alarm clocks, are well known. An example of such prior art toy phonographs is disclosed in U.S. Pat. Nos. 3,589,735; 3,208,755; 3,055,664; 3,467,393; 3,823,946; 3,401,942; 3,208,755; 3,544,115; 3,784,210; 3,984,111; Canadian Pat. No. 707,932; and British Pat. No. 828,608, by way of example. The entire field with respect to toy phonographs has been quite active with the primary motivation, because of their use in toys, being economics, efficiency and size so as to provide a practical commercial embodiment for use in economically viable children's toys. Thus, the above patents, provided by way of example, merely disclose a quantitatively small amount of the large volume of different types of toy phonographs existent in the prior art with the difference between the various prior art toy phonographs in an attempt to provide toy phonographs which are economically viable being relatively narrow since apparently minor improvements can provide a significant improvement in efficiency and economics in the area of toy phonographs. Moreover, the prior art toy phonographs known to the inventor herein all employ a single phonograph record for providing reproduced sound therefrom, even those which may employ an automatic shut off at the end of the message. The use of multiple records in such a toy phonograph is not economically practical as such toy phonographs do not employ conventional automatic record changing mechanisms such as in expensive high fidelity equipment. The present invention of the dual record toy phonograph described herein is an economic and efficient phonograph for enabling two separate phonograph records to be employed in a talking toy, the entire phonograph record playing surface being available for reproduction of a recorded message thereby providing a reasonable length message as opposed to prior art attempts to provide a plurality of messages on a common phonograph record playing surface with each of such messages necessarily being of short duration since they occupied only a portion of the entire phonograph record playing surface. The disadvantages of the prior art are overcome by the present invention.

SUMMARY OF THE INVENTION

A toy phonograph capable of reproducing recorded sound from two different records rotatably mounted on a common turntable for simultaneous rotation thereby is provided. The phonograph comprises a housing with the housing comprising a base and a turntable being rotatably mounted on the base for rotation about an axis of rotation. A first pickup arm pivoted at one end and engageable with a playing surface of a first phonograph record rotatably mounted on one side of the turntable and a second pickup arm pivoted at one end and engageable with a playing surface of a second phonograph record rotatably mounted on the opposite side of the turntable from the one side is provided. Each of the phonograph records has a periphery and each of the pickup arms is constantly placed under a force of an associated spring which urges the respective pickup arm toward the periphery of the phonograph record associated therewith. Means are provided for pressing the first pickup arm into engagement with the first phonograph record for reproducing recorded sound from the first phonograph record playing surface during its simultaneous rotation and for pressing the second pickup arm into engagement with the second phonograph record for reproducing recorded sound from the second phonograph record playing surface during its simultaneous rotation. A first speaker cone assembly comprising a lift bar is resiliently mounted on the housing above the first pickup arm and a second speaker cone assembly also comprising a lift bar is resiliently mounted on the housing above the second pickup arm. The aforementioned pressing means comprises a lift spring resiliently separately urging each of the speaker cone assemblies into contact with the associated pickup arm with a biasing force for pressing the associated pickup arm into engagement with its associated phonograph record for reproducing the recorded sound from the phonograph record playing surface during its simultaneous rotation. Means are also provided for disengaging the associated speaker cone assembly from resilient contact with its associated pickup arm adjacent the end of the associated phonograph record recording.

In order to accomplish the aforementioned disengagement or interruption of sound reproduction from the respective phonograph record playing surfaces, each of the pickup arms comprises a protrusion extending upwardly therefrom substantially normal to the associated phonograph record playing surface and pivotally movable with the pickup arm and each of the lift bars associated with the speaker cone assemblies comprises an aperture for receiving such a protrusion therein with this aperture being located above the phonograph record associated with the speaker cone assembly and adjacent the end of this phonograph record recording. The aforementioned pickup arm protrusion is receivable in this lift bar means aperture when the associated pickup arm is adjacent the end of the phonograph record recording for interrupting the reproducing of the recorded sound from the phonograph record playing surface. In addition, the rotatable drive of the common turntable is halted when both of the pickup arms are received in the respective associated apertures of the lift bars so as to only provide a single play reproduction of recorded sound from the phonograph record playing surface. In order to accomplish this, a bistable switch for activating and deactivating the turntable drive dependent on the state of the switch is provided, with the turntable drive being activated to rotatably drive the common turntable in a first state of the switch and being deactivated to halt such rotatable drive of the common turntable in a second state of the switch. The switch comprises means adjacent each of the first and second phonograph record recording ends, such as a leaf spring contact, which are cooperable with the first and second pickup arms which bear against the associated leaf spring contacts to bias them to an open position from a normally closed position when both the first and second pickup arm protrusions are received in the respective first and second lift bar apertures. The leaf spring contact associated with the first phonograph record and the leaf spring contact associated with the second phonograph record are electrically connected in parallel in the drive circuit for the turntable so that if either leaf spring contact is in a closed circuit condition, indicating that the associated pickup arm is not at the end of the recording, the drive circuit may be closed and the turntable rotatably driven. Each of the leaf spring contacts is normally biased towards a closed circuit condition and is only held in an open circuit condition when the associated pickup arm bears against it when the pickup arm protrusion is received in the associated lift bar aperture at the end of the recording. Each of the lift bars comprises an extension portion extending out of the housing for enabling the lift bar aperture to be raised above the associated pickup arm protrusion received therein for enabling the pickup arm to be resiliently reset to the periphery of its associated phonograph record by means of the spring which urges it towards the periphery of the record.

The aforementioned toy phonograph may be employed to provide a talking toy bank in which instance the toy phonograph housing will include a receptable for receiving inserted coins as well as slots therein for enabling coins to be inserted therethrough. Each of the coin receiving slots has a coin receiving means associated therewith which is operatively associated with a lift bar extension portion and in communication with a coin receiving slot for raising the associated lift bar aperture above the pickup arm protrusion received therein in response to insertion of the coin in the coin receiving slot whereby a single play recorded message is reproduced. Two coin receiving slots may be provided with one being associated with each of the two separate phonograph records and, accordingly, each being separately operatively associated with a different lift bar extension portion and in communication with a different coin receiving slot for raising the associated lift bar aperture above the pickup arm protrusion received therein in response to insertion of a coin in the associated coin receiving slot. The insertion of the coin causes the associated lift bar extension portion to raise the associated lift bar aperture a sufficient amount to unseat the associated pickup arm protrusion and enable the pickup arm to be resiliently reset to the periphery of the record for initiating the reproduction of the message recorded thereon. At the same time, since the pickup arm no longer bears against its associated leaf spring contact, the normal biasing of the leaf spring contact places it in closed circuit condition activating the rotatable drive of the common turntable whereby the message is reproduced. The coin receiving means thereafter conventionally drops the coin into the receptacle. When the pickup arm protrusion again reseats in the lift bar aperture at the end of the recording, the pickup arm again biases the leaf spring contact to an open circuit condition and, assuming that the pickup arm associated with the phonograph record located on the opposite side of the common turntable is also seated or received in its associated lift bar aperture, the turntable drive circuit is placed in an open circuit condition halting rotation of the turntable, thereby turning off the phonograph until another coin is subsequently inserted through the coin receiving slot to again enable reset of the pickup arm to the periphery of the record for reproducing a message. The message reproduced is preferably recorded in a counterclockwise sound reproducing groove on one of the phonograph records while being recorded in a clockwise sound reproducing groove in the phonograph record located on the opposite side of the turntable with the first pickup arm being pressable into engagement with the first phongraph record for reproducing recorded sound from the first phonograph record clockwise sound reproducing groove during rotation of the common turntable and the second pickup arm being pressable into engagement with the second phonograph record for reproducing recorded sound from the second phonograph record counterclockwise sound reproducing groove during rotation of the common turntable, assuming the reproduced messages are so recorded on the first and second phonograph records, respectively. When a talking toy bank is provided, each of the coin receiving slots may correspond to a different denomination coin with a different message being reproduced from the toy phonograph for each of the different coins.

DETAILED DESCRIPTION OF PREFERRED EMBODIMENTS

Figure 1:
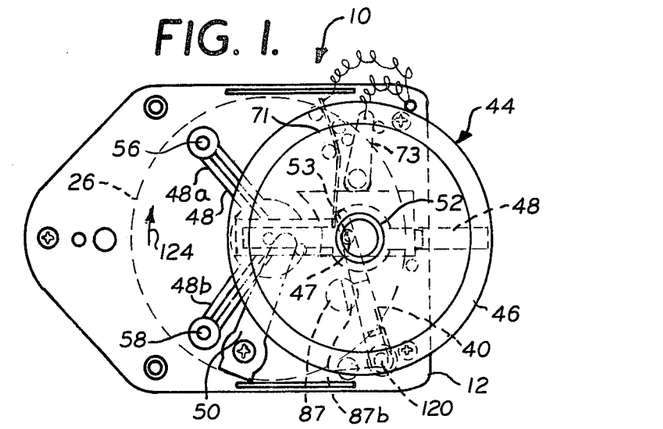
FIG. 1 is a top plan view of the preferred embodiment of the dual record toy phonograph of the present invention with the cover removed.
Figure 2:
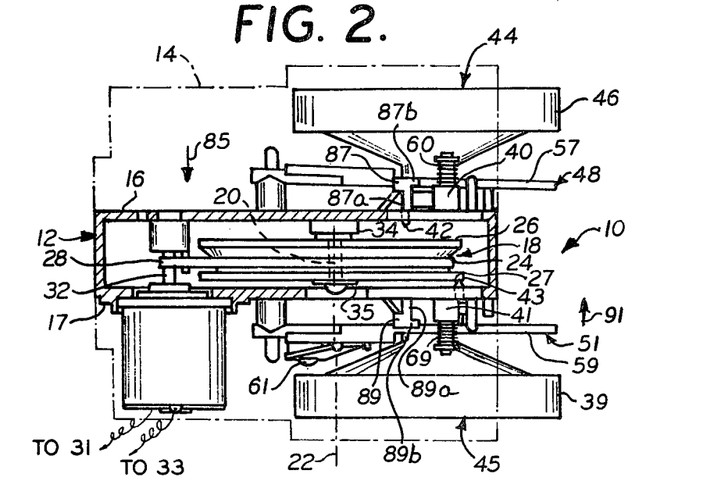
FIG. 2 is a partially cut away side elevation of the embodiment of FIG. 1 with the cover shown in position in dotted lines.
Figure 3:
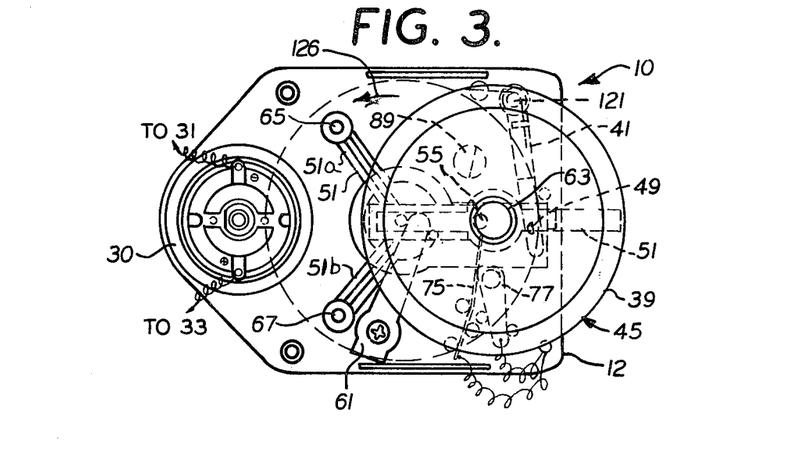
FIG. 3 is a bottom plan view of the preferred embodiment of the dual record toy phonograph of the present invention with the cover removed, FIGS. 1 and 3 being top plan and bottom plan views, respectively, with respect to FIG. 2.

Referring now to the drawings in detail and initially to FIGS. 1, 2 and 3 thereof, a dual record resettable toy phonograph, generally referred to by the reference numeral 10, in accordance with the present invention is shown. As in previous conventional toy phonographs, such as described in U.S. Pat. No. 3,589,735, or as described with reference to my improved toy phonograph of the type described in my previous U.S. Pat. No. 3,984,111, or in my copending U.S. patent application entitled "Improved Resettable Toy Phonograph", filed Dec. 6, 1976 bearing U.S. Ser. No. 747,485, the phonograph comprises a housing 12 to which a cover 14 normally containing a speaker grill (not shown), is mounted conventionally such as by screws. However, as will be described in greater detail hereinafter, unlike previous conventional toy phonographs, the dual record toy phonograph 10 of the present invention preferably comprises two speaker grills, one on each side of the housing with a common turntable 18 having two phonograph records 26 and 27 rotatably mounted on opposite sides thereof. The housing 12 as shown and preferred in FIG. 2, preferably comprises a symmetrical housing including an upper base portion 16 and a lower base portion 17, either of which or both, may be preferably fixedly secured to the balance of the housing 12 such as by screws which are removable so as to allow access to the interior of the housing 12.

The aforementioned turntable 18 is preferably a conventional type of turntable except for its ability to rotatably retain phonograph records 26 and 27 on opposite sides thereof. Turntable 18 is preferably rotatably mounted on base portion 16, by way of example, between base portions 16 and 17, in housing 12 by means of a conventional centrally located spindle or shaft 20 illustratively shown as being mounted to base portion 16. The shaft 20 is preferably located along the central axis 22 of the turntable 18. As shown and preferred in FIGS. 2 and 4, and as described in my previous U.S. Pat. No. 3,984,111 and my copending U.S. patent application entitled "Improved Resettable Toy Phonograph", filed Dec. 6, 1976 bearing U.S. Ser. No. 747,485, the configuration of the turntable 18 is such so as to form a groove 24 normal to the axis 22 of the shaft 20 in conjunction with phonograph records 26 and 27 which are preferably removably mounted on opposite sides of the turntable 18 for simultaneous rotation therewith. As also shown and preferred in FIGS. 2 and 4, the groove 24 which preferably extends completely around the turntable 18, contains an endless belt, such as a conventional rubberband 28, which is driven in conventional fashion by a conventional DC motor 30 which receives power from a DC source such as a battery 31 (FIG. 5), with the motor 30 being conventionally turned on and off by means of a conventional on/off switch 33 in conjunction with parallel switches 35 and 37, which will be described in greater detail hereinafter in conjunction with the description of the automatic shut off feature of the present invention. The turntable 18 drive is accomplished in conventional fashion by a knurled shaft 32 which extends from the motor 30 into the interior of the housing 12, with the rubberband or belt 28 extending around the shaft 32 and around the turntable 18 in groove 24 so as to create a belt drive type of conventional arrangement which is well known for the drive of battery powered toy phonographs.

Each of the phonograph records 26, 27 is preferably a conventional type of plastic disc record such as the type conventionally utilized for talking voice boxes or toy phonographs, such as for use in dolls. However, one of the phonograph records, for example phonograph record 26, is conventionally recorded with a conventional clockwise sound reproducing groove containing the message to be reproduced from the phonograph record 26, while the other phonograph record 27 is preferably recorded with a counterclockwise sound reproducing groove for reproducing the recorded message from phonograph record 27. The manner of actually recording the message in the counterclockwise sound reproducing groove of phonograph record 27 is conventional with the exception that, whereas conventional recordings are accomplished in the clockwise direction, the recording on phonograph record 27 is preferably accomplished in the counterclockwise direction determined by rotation of phonograph record 27 in the direction opposite to the normal direction of rotation during the initial recording thereof. In this manner, when common turntable 18 rotates in conventional clockwise fashion about turntable axis 22, the recording contained on phonograph record 26 will be reproducible from a clockwise sound reproducing groove, whereas the recording contained on phonograph record 27 will be reproduced from a counterclockwise sound reproducing groove, the reproduction of the recorded message otherwise being identical. As also shown and preferred in FIG. 2, phonograph record 26 is preferably removably mountable on one side of turntable 18 by a snap-fit, being held in place by means of conventional resilient plastic fingers 34, by way of example, and phonograph record 27 is preferably removably mountable on the opposite side of turntable 18 by a similar snap-fit onto turntable 18, being held in place by means of identical resilient plastic fingers 35, by way of example. The recordings contained in phonograph records 26 and 27 are preferably different in content, although they could be identical in content if desired.

Figures 4, 5, 6:
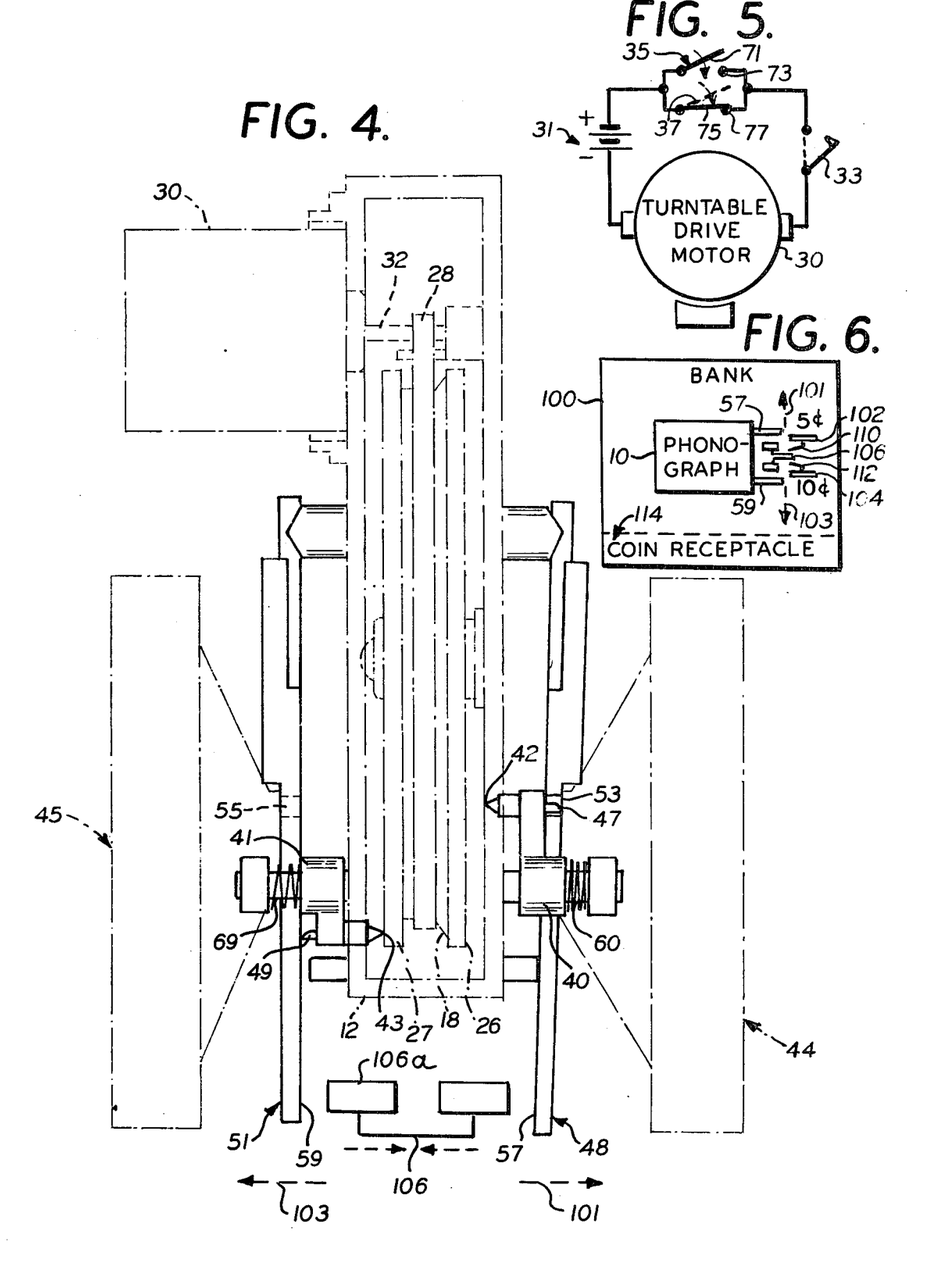
FIG. 4 is a side elevation similar to FIG. 2 with only the pickup arm and lift bar assemblies being shown in solid lines, illustrating one pickup arm at the end of the recording and the pickup arm on the opposite side at the beginning of a recording.
FIG. 5 is a schematic illustration of the turntable drive circuit of the embodiment of FIG. 1.
FIG. 6 is a block diagram of a talking toy bank employing the dual record toy phonograph of the present invention.

As also shown and preferred in FIGS. 1 through 4, the toy phonograph 10 of the present invention utilizes a conventional type of sound pickup mechanism for reproducing recorded sound from the phonograph record 26 playing surface and from the phonograph record 27 playing surface. This conventional type of sound pickup mechanism, such as the type described in my previous U.S. Pat. No. 3,984,111 and my copending U.S. patent application entitled "Improved Resettable Toy Phonograph", filed Dec. 6, 1976 bearing U.S. Ser. No. 747,485 or in U.S. Pat. Nos. 3,589,735 or 3,054,664 or Canadian Pat. No. 707,932, preferably consists of a pickup arm 40–41 having a conventional phonograph needle 42–43 extending therefrom for contacting the playing surface of the respective phonograph record 26–27, and an associated speaker cone assembly 44 and 45, respectively. Pickup arm 40, needle 42, and speaker cone assembly 44 are associated with phonograph record 26 and pickup arm 41, needle 43 and speaker cone assembly 45 are associated with phonograph record 27. When the speaker cone assembly 44 or 45 is in direct contact with its associated pickup arm 40 or 41, respectively, such as illustrated in FIGS. 2 and 4 which illustrate the direct contact between speaker cone assembly 45 and pickup arm 41, sound is conventionally reproduced from the phonograph record playing surface 27, by way of example, picked up by the needle 43, by providing this sound in conventional fashion by vibration of the speaker cone 39 forming part of the speaker cone assembly 45. Similarly, when speaker cone assembly 44 is in direct contact with pickup arm 40, sound is conventionally reproduced from the phonograph record playing surface 26 picked up by the needle 42, by providing this sound in conventional fashion by vibration of the speaker cone 46 forming part of the speaker cone assembly 44.

In addition to the unique provision of two separate pickup arms 40 and 41 and two separate speaker cone assemblies 44 and 45 in conjunction with two separate phonograph records 26 and 27 being simultaneously rotated by a common turntable 18, the pickup arms 40 and 41 of the present invention are different in configuration from the pickup arms described in my previous U.S. Pat. No. 3,984,111. However, these pickup arms 40 and 41 are preferably identical with the pickup arm described in my copending U.S. patent application entitled "Improved Resettable Toy Phonograph", filed Dec. 6, 1976 bearing U.S. Ser. No. 747,485. Thus, pickup arms 40 and 41 do not have hook portions parallel to the playing surface of the respective associated phonograph records 26 and 27 but preferably contain an upstanding protrusion 47 and 49, respectively, preferably substantially normal to the associated phonograph record playing surfaces 26 and 27, respectively. It is these protrusions 47 and 49 which, as will be described in greater detail hereinafter, are preferably integrally formed with the balance of the pickup arm assemblies 40 and 41, respectively, which preferably maintain the direct contact with the associated speaker cone assembly 44 and 45, respectively, for conventionally reproducing sound from the phonograph record playing surfaces 26 and 27, respectively, picked up by the needles 42 and 43, respectively.

As also shown and preferred in FIGS. 1 through 4, each of the speaker cone assemblies 44 and 45 also preferably comprises an associated conventional type Y-shaped lift bar mechanism 48 and 51, respectively, for enabling the associated speaker cone 46 and 39, respectively, to be lifted out of and biased into engagement with the respective pickup arm 40 and 41, respectively, as is accomplished in conventional available toy phonographs. However, unlike my previous U.S. Pat. No. 3,984,111 or my copending U.S. patent application entitled "Improved Resettable Toy Phonograph", filed Dec. 6, 1976 bearing U.S. Ser. No. 747,485 there is no specific camming mechanism for accomplishing the engagement and disengagement of the speaker cone assemblies 44 and 45 with the respective pickup arms 40 and 41, such disengagement rather being accomplished by a mechanically operable reset capability of the associated lift bar mechanisms 48 and 51 which is not conventional. Moreover, as will be described in greater detail hereinafter, the toy phonograph 10 of the present invention is preferably designed so as to provide only a single play of the recording from the phonograph record 26 or 27 unless the associated pickup arm 40 or 41 is again reset, such as results from the mechanical lifting of the associated lift bar assembly 48 or 51, as will be described in greater detail hereinafter, such as when the toy phonograph 10 comprises part of a talking toy bank. As is further shown and preferred in FIGS. 1 through 4, each of the preferred lift bar mechanisms 48 and 51 preferably includes an associated aperture 53 and 55, respectively, therein, capable of removably receiving the respective upstanding protrusion 47 or 49 of the associated pickup arm 40 and 41, respectively, therein when the associated pickup arm 40 or 41 is pivotally moved into position and alignment with aperture 53 or 55, respectively, during the play of the phonograph record 26 or 27, respectively. Aperture 53 is preferably located above the phonograph record playing surface 26 adjacent the end of the phonograph record 26 recording for enabling automatic shut off of reproduction of the phonograph record 26 recording at the end of the record 26, as will be described in greater detail hereinafter, and aperture 55 is preferably located above the phonograph record playing surface 27 adjacent the end of the phonograph record 27 recording for enabling automatic shut off of reproduction of the phonograph record 27 recording at the end of the record 27, whereby a single play of the message recorded on the respective phonograph record playing surfaces 26 and 27 is provided, as will be described in greater detail hereinafter. Subsequent automatic reset of the associated pickup arm 40 or 41 to the periphery or beginning of the respective phonograph records 26 and 27, is accomplished by mechanical lifting of the associated lift bar assemblies 48 and 51, respectively, as will be described in greater detail hereinafter, which raises the associated lift bar apertures 53 and 55, respectively, above the height of the protrusion 47 and 49, respectively, seated therein to enable automatic reset of the pickup arm 40 or 41, respectively, to the periphery or beginning of the associated phonograph record 26 or 27 as will be described in greater detail hereinafter. In order to accomplish this mechanical reset, as will also be described in greater detail hereinafter, each of the preferred Y-shaped lift bar mechanisms 48 and 51 preferably comprises an integral extension portion 57 and 59, respectively, which extends beyond housing 12 in order to enable mechanical lifting of the associated lift bar mechanisms 48 and 51 and subsequent reset of the respective pickup arms 40 and 41 to the periphery or beginning of the associated phonograph record playing surfaces 26 and 27 whenever such mechanical lifting occurs to either raise the associated lift bar aperture 53 or 55 a sufficient amount to unseat the associated protrusion 47 or 49 of the pickup arm 40 or 41, respectively, or to remove the direct bearing contact between the lift bar assembly 48 or 51, respectively, and the associated pickup arm protrusion 47 or 49 at any position of the respective pickup arms 40 and 41 along the respective phonograph record playing surfaces 26 and 27. Such extension portions 57 and 59 are similar to those described with reference to my copending U.S. patent application entitled "Improved Resettable Toy Phonograph", filed Dec. 6, 1976 bearing U.S. Ser. No. 747,485, but are not present in my previously described improved toy phonograph disclosed in U.S. Pat. No. 3,984,111.

As shown and preferred in FIGS. 1 through 3, each of the pickup arms 40 and 41 are preferably spring biased into playing engagement with the associated phonograph record playing surface 26 or 27, respectively, such as by a conventional leaf spring 50 or 61, respectively, respectively bearing against the associated lift bar 48 or 51, which lift bar 48 or 51, is preferably fixedly secured to the associated speaker cone 46 or 39, respectively, at the respective center 52 or 63 thereof, as shown and preferred in FIGS. 2 and 4. Each of the lift bar mechanisms 48 and 51 and, hence, the entire associated speaker cone assemblies 44 and 45 which each separately move as a unit, are slidably mounted via extension arms 48a and 48b of the Y-shape forming the lift bar 48 on posts 56 and 58, respectively, and via extension arms 51a and 51b of the Y-shape forming the lift bar 51 on posts 65 and 67, respectively, for slidable movement up and down therealong. A third point of contact or support of the lift bar 48 is made at point 52 which is in removable spring biased contact with the pickup arm 40 protrusion 47 and a third point of contact or support of the lift bar 51 is made at point 63 which is in revmovable spring biased contact with the pickup arm 41 protrusion 49, as is shown and preferred in FIGS. 2 and 4. As was previously mentioned, the spring 50 resiliently presses against the lift bar 48 and, thus, biases point 52 of the speaker cone assembly 44 into direct contact with protrusion 47 on pickup arm 40 which then biases the needle 42 into playing engagement with the phonograph record playing surface 26, and the spring 61 resiliently presses against the lift bar 51 and, thus, biases point 63 of the speaker cone assembly 45 into direct contact with protrusion 49 on pickup arm 41 which then biases the needle 43 into playing engagement with the phonograph record playing surface 27.

Pickup arm 40, via a conventional spring 60, is preferably conventionally spring biased in a direction parallel to the playing surface of the phonograph record 26 toward the periphery thereof; however, the force of spring 50 is preferably sufficient to overcome the force of spring 60 so as to prevent the pickup arm 40, in conventional fashion, from moving towards the periphery of the phonograph record 26 during play while the speaker cone assembly 44 is in direct bearing contact with the protrusion 47 on pickup arm 40. Similarly, pickup arm 41 via a conventional spring 69, is preferably conventionally spring biased in a direction parallel to the playing surface of the phonograph record 27 toward the periphery thereof; however, the force of spring 61 is preferably sufficient to overcome the force of spring 69 so as to prevent the pickup arm 41, in conventional fashion, from moving toward the periphery of the phonograph record 27 during play while the speaker cone assembly 45 is in direct bearing contact wwith the protrusion 49 on pickup arm 41.

As is shown and preferred in FIGS. 1 through 4, and particularly in FIGS. 1, 2 and 4, and as will be described in greater detail hereinafter, when the pickup using pickup arm 40 by way of example in FIG. 4, the operation being identical for pickup arm 41 and record 27, reaches the end of the phonograph record 26, that is the end of the recording, which is conventionally located adjacent the center of the record 26, the pickup arm protrusion 47 will seat in the lift bar aperture 53 thereby removing the direct bearing contact of the speaker cone assembly 44 with the protrusion 47 on the pickup arm 40. In addition, as is shown by reference to FIGS. 1 and 5, a conventional electrical leaf spring contact arrangement 71–73, which comprises switch 35, by way of example, and which is normally biased to the closed circuit condition, is then forceably held in the open circuit condition due to pickup arm 40 bearing against leaf spring contact 71 removing it from electrical contact against contact 73 and is held in this position as long as the pickup arm protrusion 47 is seated in the lift bar aperture 53. As is shown by reference to FIG. 5, a similar leaf spring electrical contact arrangement 75–77, which comprises switch 37 by way of example, is provided on the opposite side with respect to pickup arm 41 and phonograph record 27, with this leaf spring switch arrangement 75–77 being shown in the closed circuit condition in FIGS. 3 and 5. In this closed circuit condition, as long as on/off switch 33 is closed, power will be supplied from power source 31, to the turntable drive motor 30, to effect rotatable drive of turntable 18 and, correspondingly, simultaneous rotation of phonograph records 26 and 27. However, as long as the pickup arm protrusion 47 is seated in the lift bar aperture 53, the needle 42 is not in contact with the phonograph record playing surface 26 and sound cannot thereby be reproduced from the phonograph record 26 although, since as illustratively shown by way of example in FIG. 4, the needle 43 associated with pickup arm 41 is in contact with the phonograph record playing surface 27 due to direct bearing contact between lift bar 51 and the protrusion 49 on the pickup arm 41, sound will be reproduced from the phonograph record playing surface 27 from the counterclockwise groove recorded therein. Of course, if on/off switch 33 is manually moved to the open circuit condition, phonograph 10 will not operate irrespective of the open or closed circuit condition of switches 35 and 37 defined by contacts 71–73 and 75–77, respectively. Moreover, if on/off switch 33 is in the closed circuit condition, and both switches 35 and 37 are in the open circuit condition, the toy phonograph 10 of the present invention will not operate to produce sound since the turntable drive motor 30 will not be turned on. This latter condition preferably occurs when both pickup arms 40 and 41 have their respective protrusions 47 and 49 seated in lift bar apertures 53 and 55, respectively, with both of the pickup arms 40 and 41 located at the ends of the respective recordings associated with phonograph records 26 and 27, respectively. As will be described in greater detail hereinafter, this is the preferred off condition for the phonograph 10, such as when the phonograph 10 forms part of a talking toy bank as will be described in greater detail hereinafter. Thus, in such a condition, when pickup arm 41, shown at the beginning of the record or periphery of phonograph record 27 in FIGS. 2 and 4, reaches the end of the phonograph record 27, that is the end of the recording, which is conventionally located adjacent the center of the record 27, the protrusion 49 will seat in lift bar aperture 55 thereby removing the direct bearing contact of the speaker cone assembly 45 with the protrusion 49 on the pickup arm 41 and opening switch 37 by separating electrical contacts 75 and 77 due to pickup arm 41 bearing against leaf spring 75 to bias it to the open circuit condition. It should be noted that preferably leaf springs 71 and 75 are normally biased to the closed circuit condition by being normally biased in a direction placing them into contact with electrical contacts 73 and 77, respectively.

As shown and preferred in FIG. 2, an additional upstanding member 87 is provided adjacent the end of the phonograph record 26 recording which extends from housing 12 above the phonograph record playing surface 26 and is preferably located between the lower surface of the lift bar mechanism 48 and the phonograph record playing surface 26, and a separate additional upstanding member 89 is provided adjacent the end of the phonograph record 27 recording which extends from housing 12 above the phonograph record playing surface 27 and is preferably located between the lower surface of the lift bar mechanism 51 and the phonograph record playing surface 27. Members 87 and 89 each preferably comprise a portion 87a and 89a, respectively, which extends substantially normal to the playing surface and acts as a stop member for the pickup arm 40 and 41, respectively, when the pickup arm reaches the end of the recording, and an overhang portion 87b and 89b, respectively, which extends substantially parallel to the playing surface of phonograph records 26 and 27, respectively. Overhang portion 87b is preferably located at a sufficient height so as to enable the top surface of the pickup arm 40 from which the protrusion 47 extends to be seated therebeneath when the protrusion 47 is seated in lift bar aperture 53, as illustrated in FIG. 4. Similarly, overhang portion 89b is preferably located at a sufficient height so as to enable the top surface of the pickup arm 41 from which the protrusion 49 extends to be seated therebeneath when the protrusion 49 is seated in the lift bar aperture 55. Preferably, the height of overhang 87b is sufficient to enable some space to exist sufficient to enable movement of the pickup arm 40 pivotally into and out of engagement against stop member 87a while restraining upward movement of the pickup arm 40 in a direction opposite to the direction of arrow 85, and the height of overhang 89b is sufficient to enable some space to exist sufficient to enable movement of the pickup arm 41 pivotally into and out of engagement against stop member 89a while restraining upward movement of the pickup arm 41 in a direction opposite to the direction of arrow 91. The primary purpose of overhangs 87b and 89b, respectively, is to prevent the respective pickup arms 40 and 41 from lifting up with the speaker cone assemblies 44 and 45, respectively, when the speaker cone assemblies 44 and 45 are each respectively, mechanically lifted in a direction opposite to the direction of arrows 85 and 91, respectively. As previously mentioned, however, the height of the overhang portion 87b and 89b is sufficient to enable the respective pickup arms 40 and 41 to be resiliently returned to the periphery of the respective records 26 and 27 by the action of springs 60 and 69, respectively, when the respective lift bars 48 and 51 are mechanically raised a sufficient amount to raise the respective lift bar apertures 53 and 55 above the respective protrusions 47 and 49.

As further shown and preferred in FIGS. 1 through 4, and as previously mentioned, lift bar mechanism 48 also preferably includes an integral extension portion 57 for enabling mechanical reset of the pickup arm 40 to the periphery off the record 26 either to initiate reproduction of the message recorded in the clockwise groove on phonograph record 26 or at any time during the play thereof, such as before the pickup arm 40 reaches the end of the record, and lift bar mechanism 51 preferably includes an integral extension portion 59 for enabling mechanical reset of the pickup arm 41 to the periphery of the record 27 either to initiate reproduction of the message recorded in the counterclockwise groove on phonograph record 27 or at any time during the play thereof, such as before the pickup arm 41 reaches the end of the record. Extension 57 enables a force to be applied in the direction of arrow 101 at the end of extension portion 57 to lift the pickup arm 40 out of bearing engagement with protrusion 47, thereby enabling spring 60 to resiliently return pickup arm 40 to the beginning or periphery of the record 26. Such resilient return also enables switch 35 to close due to leaf spring 71 being normally biased to the closed circuit condition, which normal bias force is no longer overcome by the bearing relationship of pickup arm 40 against leaf spring 71. Thus, if on/off switch 33 is closed, the closing of switch 35 will complete the circuit from power source 31 to turntable drive motor 30, thereby turning on motor 30 and rotatably driving turntable 18 and enabling reproduction of the recorded message from phonograph record playing surface 26 due to subsequent direct bearing contact of lift bar 48 against the protrusion 47 when the pickup arm 40 reaches the periphery of the phonograph record 26. Similarly, extension 59 enables a mechanical force to be applied in the direction of arrow 103 at the end of extension portion 59 to lift the pickup arm 41 out of bearing engagement with protrusion 49, thereby enabling spring 69 to resiliently return pickup arm 41 to the beginning or periphery of the record 27, as illustrated in FIG. 4. Similarly, since pickup arm 41 does not then bear against leaf spring contact 75, switch 37 will close due to the failure to then overcome the normal biasing force of leaf spring 75 which then contacts electrical contact 77 to close switch 37. Thus, if on/off switch 33 is closed, this will complete the circuit from power source 31 to turntable drive motor 30 enabling rotatable drive of turntable 18 and, due to the subsequent direct bearing engagement of lift bar 51 with protrusion 49 on pickup arm 41, sound will be reproduced from phonograph record playing surface 27. If desired, such mechanical reset may be accomplished in conjunction with the turning on and off of the drive motor 30 by means of a conventional mechanical interconnection between the on/off switch 33 for the power supply 31 for motor 30 which switch mechanical interconnection, by way of example, could also raise lift bar 48 in the direction of arrow 101 when the switch 33 was moved to the off position or, alternatively, raise lift bar 51 in the direction of arrow 103 when the switch 33 was moved to the off position, thereby insuring that record 26 or 27 will always start at the beginning thereof when the phonograph 10 is turned on. However, most preferably, the toy phonograph 10 of the present invention may be employed in a talking toy where selection of the message to be singly reproduced is desired. In such an instance, it may be conventionally arranged to provide a mechanical interconnection to raise lift bar 48 in the direction of arrow 101 to provide one message in response to one condition and, alternatively, a mechanical interconnection to raise lift bar 51 in the direction of arrow 103 to provide another message in response a different condition. Thus, by way of example, the dual record toy phonograph 10 of the present invention may provide a talking toy bank, such as illustratively shown in block form in FIG. 6.

In such an instance, the bank, generally referred to by the reference numeral 100, may preferably have a pair of conventional coin receiving slots 102 and 104, such as labeled "5¢" and "10¢", respectively. A central mechanical member 106 may be provided which is conventionally located between lift bar extension portions 57 and 59 and out of contact therewith. Preferably, if desired, conventional leaf springs 110 and 112 may be provided to maintain mechanical member 106 in its neutral position between lift bar extension portions 57 and 59. The insertion of an appropriate coin in coin receiving slot 102, for example, will provide a force which momentarily overcomes the neutralizing biasing forces of leaf springs 110 and 112 by applying downward pressure in the direction of arrow 103 so as to overcome these normal biasing forces of springs 110 and 112 and press contact member 106a of member 106 against lift bar extension 59 a sufficient amount to raise the lift bar 51 a sufficient amount to subsequently raise lift bar aperture 55 above protrusion 49 which was preferably previously seated therein and, thus, enable spring 69 to resiliently return pickup arm 41 to the periphery of record 27, thereby also closing switch 37 by contact of leaf spring 75 with contact 77. Since switch 33 has previously been closed prior to insertion of the coin in slot 102, closure of switch 37 will complete the circuit from power source 31 to drive motor 30, thereby turning on the phonograph 10 and enabling a single play reproduction of the recorded message on phonograph record playing surface 27, with the phonograph 10 subsequently shutting off at the end of the recording 27 when the protrusion 49 again seats in lift bar aperture 55. Subsequently, if a different denomination coin, by way of example, is inserted in coin receiving slot 104, member 106 and springs 110 and 112 are preferably conventionally balanced so that the insertion of this coin through slot 104 will momentarily apply a force in the direction of arrow 101 sufficient to overcome the normal neutralizing biasing forces of springs 110 and 112 and raise extension portion 57 a sufficient amount above protrusion 47 to enable resilient return of pickup arm 40 to the periphery of the record 26 and the closure of switch 35 by contact of leaf spring 71 with contact 73, thereby enabling a single play reproduction of the message recorded on phonograph record playing surface 26, assuming on/off switch 33 was previously in the closed circuit condition. It should be noted that preferably the insertion of a coin through either slot 102 or 104 only supplies a momentary force in the direction of arrow 101 or 103, respectively, for a sufficient time to enable return of the respective pickup arm 40 or 41 to the periphery of the respective record 26 or 27 and, thereafter, conventionally drops into the coin receptacle portion 114 of the bank 100. This can be controlled in any conventional fashion such as by the positioning of the respective leaf springs 110 and 112 and the dimensions of the associated coin receiving slots 102 and 104, with the leaf springs 110 and 112 being located in coin receiving receptacles in communication with slots 102 and 104 at one end and in communication with coin receptacle 114 at the opposite end.

Each of the pickup arms 40 and 41 is preferably conventionally pivotally mounted, such as at pivot points 120 and 121, respectively, on the housing 12. As was previously described, the pickup arms 40 and 41 are biased in conventional fashion into playing engagement with the respective phonograph records 26 and 27 playing surfaces via the respective speaker cone assemblies 44 and 45 with which they are in direct bearing engagement due to the respective lift bar mechanisms 48 and 51 bearing against protrusions 47 and 49, respectively, to enable reproduction of the recorded sound. Pickup arm 40 conventionally moves along its clockwise record groove towards the center of the record 26, the direction of the groove being indicated by arrow 124 in FIG. 1, to reproduce the sound recorded on the record 26 as the turntable 18, and hence the phonograph record 26 rotates due to the belt drive 28. Similarly, pickup arm 41 conventionally moves along its counterclockwise record groove towards the center of the record 27, the direction of the counterclockwise record groove being indicated by arrow 126 in FIG. 3, to reproduce the sound recorded on the record 27 as the turntable 18 and, hence, the phonograph record 27, simultaneously rotates due to the belt drive 28. Thus, the simultaneous drive of the common turntable 18 may enable sound reproduction from either record 26 or 27 or, if desired, from both records 26 and 27 simultaneously if both speaker cone assemblies 44 and 45 are, respectively, in direct bearing engagement with respective pickup arms 40 and 41 at the same time.

Summarizing the operation of the dual record toy phonograph 10 of the present invention, the preferred starting condition for the phonograph 10 is with both the protrusion 47 seated in lift bar aperture 53 and the protrusion 49 seated in lift bar aperture 55. In this condition, both pickup arms 40 and 41 are at the end of the respective phonograph records 26 and 27 and switches 35 and 37 are both biased to the open circuit condition. Thus, closure of switch 33 will not turn on the device since both parallel switches 35 and 37 are being held in the open circuit condition, respectively, by pickup arm 40 bearing against leaf spring 71 and by pickup arm 41 bearing against leaf spring 75. Depending on the message to be reproduced, either lift bar extension 57 or 59 is mechanically lifted, such as by insertion of a coin if the device is used as a bank 100, as previously mentioned, a sufficient amount so as to raise the associated lift bar aperture, 55 by way of example, a sufficient amount to unseat the respective pickup arm 49, by way of example. This enables the pickup arm 41 to be resiliently reset to the beginning of the phonograph record 27 and removes the bearing contact of the pickup arm 41 against the leaf spring 71 which then returns the switch 35 to the closed circuit condition as illustrated in FIG. 5. Thus, with switch 33 previously closed, this completes the circuit to drive motor 30 and turns on the rotatable drive of turntable 18. Since the upward mechanical force is then no longer present on extension 59, the lift bar 51 returns to direct bearing engagement with protrusion 49 on pickup arm 41 pressing it into engagement with the phonograph record playing surface 27, reproducing the recorded sound therefrom with the pickup arm 41 moving along the groove towards the center of the record 27. When the pickup arm 41 reaches the center of the record 27, the protrusion 49 again seats in the lift bar aperture 55 which thereby overcomes the biasing force of leaf spring 75 and forces the switch 37 into the open circuit condition as well as removing the direct bearing contact of lift bar 51 with the protrusion 49 so that the needle 43 no longer contacts the phonograph record playing surface 27. This shuts off the phonograph 10 completing the single play since, as illustrated in FIG. 4, pickup arm 40 was previously situated within protrusion 47 seated in aperture 53 thereby holding switch 35 in the open circuit condition. Thus, both switches 35 and 37 are then in the open circuit condition and the phonograph 10 is automatically turned off.

What is claimed is:

1. A toy phonograph comprising a housing, said housing comprising a base; a turntable rotatably mounted on said base for rotation about an axis of rotation, a first phonograph record playing surface mounted on one side of said turntable for rotation thereby, a second phonograph record playing surface mounted on the opposite said of said turntable for rotation thereby, a first pickup arm pivoted at one end and engageable with said first phonograph record playing surface mounted on said one side of said turntable, a second pickup arm pivoted at one end and engageable with said second phonograph record playing surface mounted on said opposite side of said turntable from said one side, means for rotatably driving said turntable, said turntable being common to said first and second phonograph record playing surfaces for enabling simultaneous rotation therewith, means for pressing said first pickup arm into sound reproducing engagement with said first phonograph record playing surface for reproducing recorded sound from said first phonograph record playing surface during said simultaneous rotation thereof and for pressing said second pickup arm into sound reproducing engagement with said second phonograph record for reproducing recorded sound from said second phonograph record playing surface during said simultaneous rotation thereof, a first speaker cone means resiliently mounted on said housing above said first pickup arm, and a second speaker cone means resiliently mounted on said housing above said second pickup arm; said pressing means comprising a first spring means resiliently urging said first speaker cone means into sound reproducing contact with said first pickup arm with a biasing force for pressing said first pickup arm into said sound reproducing engagement with said first phonograph record playing surface for reproducing said recorded sound from said first phonograph record playing surface during said simultaneous rotation thereof, and a second spring means resiliently urging said second speaker cone means into sound reproducing contact with said second pickup arm with a biasing force for pressing said second pickup arm into said sound reproducing engagement with said second phonograph record playing surface for reproducing said recorded sound from said second phonograph record playing surface during said simultaneous rotation thereof; means for disengaging said first speaker cone means from said resilient sound reproducing contact with said first pickup arm adjacent the end of said first phonograph record playing surface recording and for disengaging said second speaker cone means from said resilient sound reproducing contact with said second pickup arm adjacent the end of said second phonograph record playing surface recording whereby said reproducing of said recorded sound is interrupted, said disengaging means comprising a first lift bar means associated with said first speaker cone means in sound reproducing contact therewith, said first speaker cone means being mounted for movement with said first lift bar means for enabling said first speaker cone means to be urged out of said sound reproducing engagement with said first pickup arm and a second lift bar means associated with said second speaker cone means in sound reproducing contact therewith, said second speaker cone means being mounted for movement with said second lift bar means for enabling said second speaker cone means to be urged out of said sound reproducing engagement with said second pickup arm, said first pickup arm comprising a first protrusion extending upwardly therefrom substantially normal to said first phonograph record playing surface and being pivotally movable with said first pickup arm; said second pickup arm comprising a second protrusion extending upwardly therefrom substantially normal to said second phonograph record playing surface and being pivotally movable with said second pickup arm; said first lift bar means comprising a first aperture for receiving said first protrusion therein, said first lift bar means aperture being located above said first phonograph record playing surface adjacent the end of said first phonograph record playing surface recording, said first protrusion being receivable in said first lift bar means aperture when said first pickup arm is adjacent the end of said first phonograph record playing surface recording for enabling said first pickup arm to be disengaged from said sound reproducing contact with said first phonograph record player surface for interrupting said reproducing of said recorded sound from said first phonograph record playing surface; and said second lift bar means comprising a second aperture for receiving said second protrusion therein, said second lift bar means aperture being located above said second phonograph record playing surface adjacent the end of said second phonograph record playing surface recording, said second protrusion being receivable in said second lift bar means aperture when said second pickup arm is adjacent the end of said second phonograph record playing surface recording for enabling said second pickup arm to be disengaged from said sound reproducing contact with said second phonograph record playing surface for interrupting said reproducing of said recorded sound from said second phonograph record playing surface, said disengaging means further comprising said first and second apertures.

2. A toy phonograph in accordance with claim 1 wherein said toy phonograph further comprises bistate switch means for activating and deactivating said turntable drive means dependent on the state of said switch means, said drive means being activated to rotatably drive said common turntable in a first state of said switch means and being deactivated to halt said rotatable drive of said common turntable in a second state of said switch means, said switch means comprising means adjacent the end of said first and second phonograph record playing surface recordings and being cooperable with said first and second pickup arms for placing said switch means in said second state when both said first and second pickup arm protrusions are received in said respective first and second lift bar means apertures.

3. A toy phonograph in accordance with claim 2 wherein said first and second lift bar means each comprise means for enabling said lift bar aperture to be raised above the pickup arm protrusion received therein for enabling said pickup arm to be resiliently reset to the periphery of said phonograph record playing surfaces.

4. A toy phonograph in accordance with claim 3 wherein said lift bar aperture raising enabling means comprises an extension portion of said lift bar means extending out of said housing.

5. A toy phonograph in accordance with claim 4 wherein said toy phonograph housing further comprises first and second coin receiving slots therein, said first lift bar aperture raising enabling means further comprises a first coin receiving means operatively associated with said first lift bar extension portion and in communication with said first coin receiving slot for raising said first lift bar aperture above said first pickup arm protrusion received therein in response to insertion of a coin in said first coin receiving slot; and said second lift bar aperture raising enabling means further comprises a second coin receiving means operatively associated with said second lift bar extension portion and in communication with said second coin receiving slot for raising said second lift bar aperture above said second pickup arm protrusion received therein in response to insertion of a coin in said second coin receiving slot, said toy phonograph housing further comprising a receptacle for said inserted coin.

6. A toy phonograph in accordance with claim 5 wherein said switch means is normally biased toward said first state and the insertion of said coin in either said first or second coin receiving slot further enables said switch means to return to said first state when said first or second lift bar means aperture is raised above the respective first or second pickup arm protrusion received therein.

7. A toy phonograph in accordance with claim 1 wherein said first and second phonograph record playing surfaces each have a periphery; said toy phonograph further comprising third spring means, said first pickup arm being constantly placed under a force of said third spring means which urges said first pickup arm toward the periphery of said first phonograph record playing surface; fourth spring means, said second pickup arm being constantly placed under a force of said fourth spring means which urges said second pickup arm toward the periphery of said second phonograph record playing surface; said disengaging means further comprising means for overcoming said first spring means biasing force and urging said first speaker cone means out of said sound reproducing engagement with said first pickup arm for enabling said first pickup arm to be resiliently reset to the periphery of said first phonograph record playing surface by said third spring means while subsequently returning said first speaker cone means to said resilient sound reproducing contact with said first pickup arm and for overcoming said second spring means biasing force and urging said second speaker cone means out of said sound reproducing engagement with said second pickup arm for enabling said second pickup arm to be resiliently reset to the periphery of said second phonograph record playing surface by said fourth spring means while subsequently returning said second speaker cone means to said resilient sound reproducing contact with said second pickup arm.

8. A toy phonograph in accordance with claim 7 wherein said first and second lift bar means each comprise means for enabling said lift bar aperture to be raised above the pickup arm protrusion received therein for enabling said pickup arm to be resiliently reset to the periphery of said phonograph record playing surface.

9. A toy phonograph in accordance with claim 8 wherein said lift bar aperture raising enabling means comprises an extension portion of said lift bar means extending out of said housing.

10. A toy phonograph in accordance with claim 9 wherein said toy phonograph housing further comprises first and second coin receiving slots therein, said first lift bar aperture raising enabling means further comprises a first coin receiving means operatively associated with said first lift bar extension portion and in communication with said first coin receiving slot for raising said first lift bar aperture above said first pickup arm protrusion received therein in response to insertion of a coin in said first coin receiving slot; and said second lift bar aperture raising enabling means further comprises a second coin receiving means operatively associated with said second lift bar extension portion and in communication with said second coin receiving slot for raising said second lift bar aperture above said second pickup arm protrusion received therein in response to insertion of a coin in said second coin receiving slot, said toy phonograph housing further comprising a receptacle for said inserted coin.

11. A toy phonograph in accordance with claim 10 wherein said first coin receiving slot is dimensioned for receiving a different denomination coin therein than said second coin receiving slot, whereby a talking toy bank is provided.

12. A toy phonograph in accordance with claim 10 wherein each of said coin receiving means comprises means for enabling said inserted coin to drop therefrom into said receptacle, said respective pickup arm protrusion being subsequently received in the lift bar means aperture associated with the coin receiving slot through which said coin was inserted at the end of the recording associated therewith, said protrusion remaining in said lift bar means aperture until another coin is subsequently inserted in said associated coin receiving slot for providing a subsequent single play reproducing of said recorded sound from said phonograph record playing surface.

13. A toy phonograph in accordance with claim 8 wherein said toy phonograph housing further comprises first and second coin receiving slots therein, said first lift bar aperture raising enabling means further comprises a first coin receiving means operatively associated with said first lift bar means and in communication with said first coin receiving slot for raising said first lift bar aperture above said first pickup arm protrusion received therein in response to insertion of a coin in said first coin receiving slot; and said second lift bar aperture raising enabling means further comprises a second coin receiving means operatively associated with said second lift bar means and in communication with said second coin receiving slot for raising said second lift bar aperture above said second pickup arm protrusion received therein in response to insertion of a coin in said second coin receiving slot, said toy phonograph housing further comprising a receptacle for said inserted coin.

14. A toy phonograph in accordance with claim 13 wherein said first coin receiving slot is dimensioned for receiving a different denomination coin therein than said second coin receiving slot, whereby a talking toy bank is provided.

15. A toy phonograph in accordance with claim 13 wherein each of said coin receiving means comprises means for enabling said inserted coin to drop therefrom into said receptacle, said respective pickup arm protrusion being subsequently received in the lift bar means aperture associated with the coin receiving slot through which said coin was inserted at the end of the recording associated therewith, said protrusion remaining in said lift bar means aperture until another coin is subsequently inserted in said associated coin receiving slot for providing a subsequent single play reproducing of said recorded sound from said phonograph record playing surface.

16. A toy phonograph in accordance with claim 1 wherein each of said phonograph record playing surfaces contains a second reproducing groove therein, said sound reproducing groove of said first phonograph record playing surface being a clockwise sound reproducing groove and said sound reproducing groove of said second phonograph record playing surface being a counterclockwise sound reproducing groove, said first pickup arm being pressable into said sound reproducing engagement with said first phonograph record playing surface for reproducing recorded sound from said first phonograph record playing surface clockwise sound reproducing groove during said simultaneous rotation of said common turntable and said second pickup arm being pressable into said sound reproducing engagement with said second phonograph record playing surface for reproducing recorded sound from said second phonograph record playing surface counterclockwise sound reproducing groove during said simultaneous rotation of said common turntable.

17. A toy phonograph in accordance with claim 16 wherein said first and second phonograph record playing surfaces each have a periphery; said toy phonograph further comprising third spring means, said first pickup arm being constantly placed under a force of said third spring means which urges said first pickup arm toward the periphery of said first phonograph record playing surface; fourth spring means, said second pickup arm being constantly placed under a force of said fourth spring means which urges said second pickup arm toward the periphery of said second phonograph record playing surface; said disengaging means further comprising means for overcoming said first spring means biasing force and urging said first speaker cone means out of said sound reproducing engagement with said first pickup arm for enabling said first pickup arm to be resiliently reset to the periphery of said first phonograph record playing surface by said third spring means while subsequently returning said first speaker cone means to said resilient sound reproducing contact with said first pickup arm and for overcoming said second spring means biasing force and urging said second speaker cone means out of said sound reproducing engagement with said second pickup arm for enabling said second pickup arm to be resiliently reset to the periphery of said second phonograph record playing surface by said fourth spring means while subsequently returning said second speaker cone means to said resilient sound reproducing contact with said second pickup arm.

18. A toy phonograph in accordance with claim 17 wherein said first and second lift bar means each comprise means for enabling said lift bar aperture to be raised above the pickup arm protrusion received therein for enabling said pickup arm to be resiliently reset to the periphery of said phonograph record playing surface.

19. A toy phonograph in accordance with claim 18 wherein said lift bar aperture raising enabling means comprises an extension portion of said lift bar means extending out of said housing.

20. A toy phonograph in accordance with claim 18 wherein said toy phonograph further comprises bistate switch means for activating and deactivating said turntable drive means dependent on the state of said switch means, said drive means being activated to rotatably drive said common turntable in a first state of said switch means and being deactivated to halt said rotatable drive of said common turntable in a second state of said switch means, said switch means comprising means adjacent the end of said first and second phonograph record playing surface recordings and being cooperable with said first and second pickup arms for placing said switch means in said second state when both said first and second pickup arm protrusions are received in said respective first and second lift bar means apertures.

21. A toy phonograph in accordance with claim 20 wherein said lift bar aperture raising enabling means comprises and extension portion of said lift bar means extending out of said housing.

22. A toy phonograph in accordance with claim 16 wherein said toy phonograph further comprises bistate switch means for activating and deactivating said turntable drive means dependent on the state of said switch means, said drive means being activated to rotatably drive said common turntable in a first state of said switch means and being deactivated to halt said rotatable drive of said common turntable in a second state of said switch means, said switch means comprising means adjacent the end of said first and second phonograph record playing surface recordings and being cooperable with said first and second pickup arms for placing said switch means in said second state when both said first and second pickup arm protrusions are received in said respective first and second lift bar means apertures.

23. A toy phonograph comprising a housing, said housing comprising a base; a turntable rotatably mounted on said base for rotation about an axis of rotation; a first phonograph record playing surface mounted on one side of said turntable for rotation thereby; a first pickup arm pivoted at one end and engageable with said first phonograph record playing surface mounted on said one side of said turntable; means for rotatably driving said turntable; means for pressing said first pickup arm into sound reproducing engagement with said first phonograph record playing surface for reproducing recorded sound from said first phonograph record playing surface during rotation of said turntable; a first speaker cone means resiliently mounted on said housing above said first pickup arm, said pressing means comprising a first spring means resiliently urging said first speaker cone means into sound reproducing contact with said first pickup arm with a biasing force for pressing said first pickup arm into said sound reproducing engagement with said first phonograph record playing surface for reproducing said recorded sound from said first phonograph record playing surface during said rotation thereof; means for disengaging said first speaker cone means from said resilient sound reproducing contact with said first pickup arm adjacent the end of said first phonograph record playing surface recording, said disengaging means comprising a first lift bar means associated with said speaker cone means in sound reproducing contact therewith, said first speaker cone means being mounted for movement with said first lift bar means for enabling said first speaker cone means to be urged out of said sound reproducing engagement with said first pickup arm, said first pickup arm comprising a first protrusion extending upwardly therefrom substantially normal to said first phonograph record playing surface and being pivotally movable with said first pickup arm, said first lift bar means comprising a first aperture for receiving said first protrusion therein, said first lift bar means aperture being located above said first phonograph record playing surface adjacent the end of said first phonograph record playing surface recording, said first protrusion being receivable in said first lift bar means aperture when said first pickup arm is adjacent the end of said first phonograph record playing surface recording for enabling said first pickup arm to be disengaged from said sound reproducing contact with said first phonograph playing surface for interrupting said reproducing of said recorded sound from said first phonograph record playing surface, said disengaging means further comprising said first aperture.

24. A toy phonograph in accordance with claim 23 wherein said first phonograph record playing surface has a periphery; said toy phonograph further comprising second spring means, said first pickup arm being constantly placed under a force of said second spring means which urges said first pickup arm toward the periphery of said first phonograph record; said disengaging means further comprising means for overcoming said first spring means biasing force and urging said first speaker cone means out of said sound reproducing engagement with said first pickup arm for enabling said first pickup arm to be resiliently reset to the periphery of said first phonograph record by said second spring means while subsequently returning said first speaker cone means to said resilient sound reproducing contact with said first pickup arm.

25. A toy phonograph in accordance with claim 23 wherein said toy phonograph further comprises bistate switch means for activating and deactivating said turntable drive means dependent on the state of said switch means, said drive means being activated to rotatably drive said turntable in a first state of said switch means and being deactivated to halt said rotatable drive of said turntable in a second state of said switch means, said switch means comprising means located between said first phonograph record playing surface and said first lift bar means and being cooperable with said first lift bar means for placing said switch means in said second state when said first pickup arm protrusion is received in said first lift bar means aperture.

* * * * *